United States Patent
Bluvband

(10) Patent No.: US 8,229,086 B2
(45) Date of Patent: Jul. 24, 2012

(54) APPARATUS, SYSTEM AND METHOD FOR PROVIDING SILENTLY SELECTABLE AUDIBLE COMMUNICATION

(75) Inventor: Zigmund Bluvband, Rishon LeZion (IL)

(73) Assignee: Silent Communication Ltd, Tel Aviv (IL)

( * ) Notice: Subject to any disclaimer, the term of this patent is extended or adjusted under 35 U.S.C. 154(b) by 66 days.

(21) Appl. No.: 10/403,078

(22) Filed: Apr. 1, 2003

(65) Prior Publication Data

US 2004/0196964 A1   Oct. 7, 2004

(51) Int. Cl.
*H04M 11/00* (2006.01)
*H04M 1/64* (2006.01)
*H04L 29/08* (2006.01)

(52) U.S. Cl. ............. 379/88.13; 379/88.22; 455/414.4
(58) Field of Classification Search ........... 379/88.13; 455/412.1
See application file for complete search history.

(56) References Cited

U.S. PATENT DOCUMENTS

| | | | |
|---|---|---|---|
| 3,828,132 A | 8/1974 | Flanagan et al. | |
| 4,389,546 A | 6/1983 | Glisson et al. | |
| 4,585,907 A | 4/1986 | Giammarrusco | |
| 4,856,066 A | 8/1989 | Lemelson | |
| 4,912,764 A | 3/1990 | Hartwell et al. | |
| 4,996,707 A * | 2/1991 | O'Malley et al. | 379/100.13 |
| 5,189,692 A | 2/1993 | Ferrara | |
| 5,199,062 A | 3/1993 | Von Meister et al. | |
| 5,327,486 A * | 7/1994 | Wolff et al. | 379/93.23 |
| 5,544,230 A | 8/1996 | Megyesi | |
| 5,572,576 A * | 11/1996 | Klausner et al. | 379/88.11 |
| 5,581,604 A | 12/1996 | Robinson et al. | |
| 5,621,891 A | 4/1997 | Ruhl et al. | |
| 5,630,205 A | 5/1997 | Ekelund | |
| 5,717,739 A | 2/1998 | Dyer et al. | |
| 5,790,957 A | 8/1998 | Heidari | |
| 5,917,893 A | 6/1999 | Katz | |
| 5,920,835 A * | 7/1999 | Huzenlaub et al. | 704/235 |
| 6,249,808 B1 * | 6/2001 | Seshadri | 709/206 |
| 6,301,338 B1 * | 10/2001 | Makela et al. | 379/88.21 |
| 6,404,860 B1 * | 6/2002 | Casellini | 379/88.17 |
| 6,421,707 B1 * | 7/2002 | Miller et al. | 709/206 |
| 6,577,859 B1 * | 6/2003 | Zahavi et al. | 455/412.1 |
| 6,708,152 B2 * | 3/2004 | Kivimaki | 704/260 |

(Continued)

FOREIGN PATENT DOCUMENTS

DE    100 52 368 A1    5/2002

(Continued)

OTHER PUBLICATIONS

Text of the First Office Action of the Chinese Application.

(Continued)

*Primary Examiner* — Joseph T Phan
(74) *Attorney, Agent, or Firm* — Vladimir Sherman; Professional Patent Solutions

(57) ABSTRACT

An apparatus and method for providing silently selectable audible communication. The apparatus may include a memory unit for storing a plurality of pre-recorded messages, and a messaging module for selecting, editing and/or transmitting selected messages to a second party for receipt in a voice mode, whereby a conversation may be implemented in a silent mode by at least one party. A method is also provided for adding new messages (or editing old ones) to a silently selectable audible communication system, and for conducting a silently selectable audible conversation.

5 Claims, 6 Drawing Sheets

U.S. PATENT DOCUMENTS

| | | | |
|---|---|---|---|
| 6,741,678 B2 * | 5/2004 | Cannell et al. | 379/88.14 |
| 6,823,184 B1 * | 11/2004 | Nelson | 455/418 |
| 7,106,852 B1 * | 9/2006 | Nelson et al. | 379/387.01 |
| 7,272,563 B2 * | 9/2007 | Nelson | 704/270 |
| 7,286,649 B1 * | 10/2007 | Nelson et al. | 379/71 |
| 7,305,068 B2 * | 12/2007 | Tucker et al. | 379/88.11 |
| 7,418,381 B2 * | 8/2008 | Blair | 704/235 |
| 7,443,962 B2 * | 10/2008 | Basu | 379/88.18 |
| 7,519,042 B2 * | 4/2009 | Gorday et al. | 370/347 |
| 7,650,170 B2 * | 1/2010 | May et al. | 455/569.2 |
| 7,657,252 B2 * | 2/2010 | Futami | 455/412.1 |
| 7,747,260 B2 * | 6/2010 | Dowling et al. | 455/458 |
| 7,792,253 B2 * | 9/2010 | Agapi et al. | 379/88.14 |
| 7,844,037 B2 * | 11/2010 | Champlin et al. | 379/88.17 |
| 7,937,125 B2 * | 5/2011 | May et al. | 455/575.2 |
| 8,005,194 B2 * | 8/2011 | Venkataraman et al. | 379/88.13 |
| 8,019,056 B2 * | 9/2011 | Worley et al. | 379/88.18 |
| 8,086,289 B2 * | 12/2011 | May et al. | 455/575.2 |
| 2003/0228002 A1 * | 12/2003 | Tucker et al. | 379/88.01 |
| 2004/0176114 A1 * | 9/2004 | Northcutt | 455/466 |

FOREIGN PATENT DOCUMENTS

| | | |
|---|---|---|
| EP | 0 851 647 A2 | 7/1998 |
| EP | 851647 A2 * | 7/1998 |
| EP | 1 009 145 A1 | 6/2000 |
| EP | 1009145 A1 | 6/2000 |
| JP | 2000-324235 | 11/2000 |
| JP | 2001-168977 | 6/2001 |
| JP | 2003-008692 | 1/2003 |
| WO | WO 01 17275 A2 | 3/2001 |
| WO | WO 0117275 A2 | 3/2001 |

OTHER PUBLICATIONS

International Search Report of Application No. PCT/IL04/00295 issued on Feb. 28, 2005.
European Search Report of Application No. EP 03 00 7542 issued on Aug. 1, 2003.
Translation of Russian Office Action, Application No. 2005132634 issued on May 28, 2008.
Translation of Japanese Office Action, Application No. 2006-507596, mailed on Nov. 20, 2008.

* cited by examiner

APPARATUS, SYSTEM AND METHOD FOR PROVIDING SILENTLY SELECTABLE AUDIBLE COMMUNICATION

FIELD OF THE INVENTION

The present invention relates generally to the field of telephony, and more specifically to an apparatus, system, and method for enabling silently selectable audible communication.

BACKGROUND OF THE INVENTION

With the explosive increase in use of cellular radio telephones, for example, many situations have arisen where a mobile phone user wishes to converse with a distant party, yet is inhibited from so doing by the need to maintain silence at the location at which the phone is being used. Typical examples of such locations are theaters, concerts, places of worship, lectures, or when the user is participating in an important meeting.

Switching off a cellular telephone can be particularly problematic for users expecting important incoming calls etc. It is often not feasible for user to leave the room or hall at the time such a call is expected or received. Moreover a person leaving to go outside will in many instances cause almost as much of a disturbance as accepting the call.

It would be highly advantageous to have a system that can effectively enable a user of a communication device to transmit voice data without speaking into the device.

SUMMARY OF THE INVENTION

There is provided, in accordance with an embodiment of the present invention, an apparatus, system, and method for transmitting prerecorded key-to-speech, text-to-speech or synthesized messages to at least a second (distant) telephone unit while maintaining silence at the transmitting telephone unit.

According to some embodiments of the present invention, a telephone communication apparatus is provided having selectable silent messages for audible transmission. The system may include a memory for storing a plurality of prerecorded messages; a means for synthesizing two or more messages optionally in real-time; a messaging module associated with the memory for the selection and transmission in real time of at least one selected message to at least a second party for receipt thereof in a voice mode. In this way a real-time two-way conversation may be carried out either in audible or silent mode, by one or more users conducting a conversation between them.

According to some embodiments of the present invention, various components of the apparatus may be housed in a conversation unit (an enclosure) connectable to a nearby cellular telephone or alternative communications unit.

In other embodiments of the present invention, various components of the communication apparatus are miniaturized and are contained in the housing of a cellular telephone and are connected to or designed as a part of its circuitry.

In an additional embodiment of the present invention, various elements of the communication apparatus which (software and/or hardware) are located in a central facility administered by a service provider. The service provider may require the entering of a user code to access the silent communication services from the service provider.

In some embodiments of the present invention wherein the memory module is outside the cellular telephone, limitations on memory size may not be significant. For this reason, a large variety of messages of longer size may be stored, and there may be no need for compression and/or decompression of messages.

According to some embodiments of the present invention, a telephone communication apparatus is provided having selectable silent messages for audible transmission. The system may enable editing messages in real time for creating a new message or modifying a message for at least a second party for receipt thereof in a voice mode. In this way a real-time two-way conversation may be carried out either in audible or silent mode between a call initiator, a call receiver and/or both call initiator and call receiver.

In some embodiments of the present invention the system can be implemented as a part of an operating system of the cellular telephone or alternative communication unit.

According to some embodiments of the present invention, a silent communication service may enable various call control functions such as call conferencing, call transfer, etc.

BRIEF DESCRIPTION OF THE DRAWINGS

The principles and operation of the system, apparatus, and method according to the present invention may be better understood with reference to the drawings, and the following description, it being understood that these drawings are given for illustrative purposes only and are not meant to be limiting, wherein.

Figure 1:
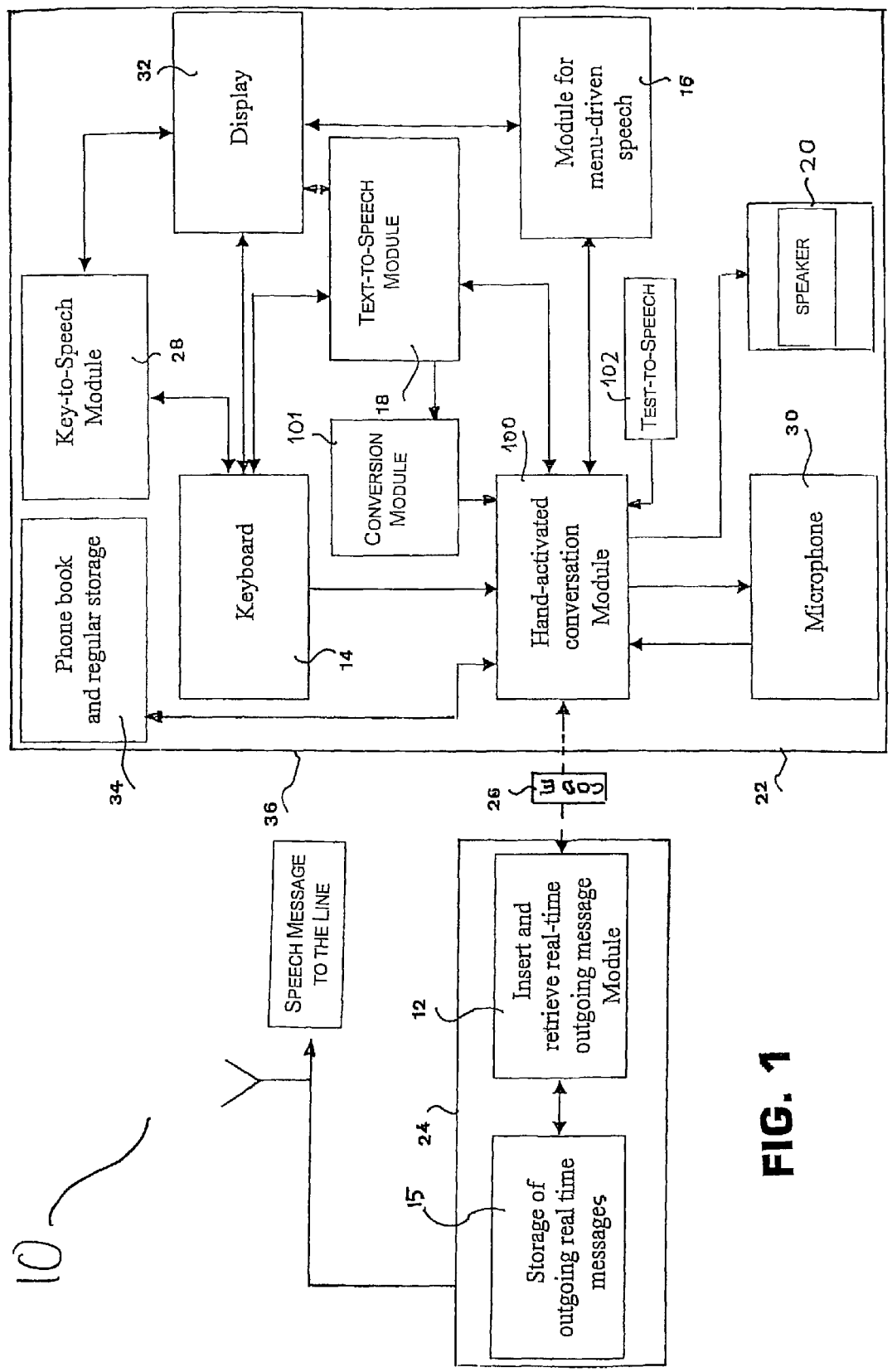
FIG. 1 is a block diagram representing an embodiment of a silent communication system according to an embodiment of the present invention, wherein the system storage and real-time messages is located at a central facility.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

The following description is presented to enable one of ordinary skill in the art to make and use the invention as provided in the context of a particular application and its requirements. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The platforms, processes and displays presented herein are not inherently related to any particular computer or other apparatus. Various general-purpose computing systems and networking equipment may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the present invention as described herein.

In the following detailed description, numerous specific details are set forth in order to provide a thorough understanding of the present invention. However, it will be understood by those skilled in the art that the present invention may be practiced without these specific details. In other instances, well-known methods, procedures and components have not been described in detail so as not to obscure the present invention.

The word "cellular" telephone as used hereinafter may encompass any mobile telephone unit. The word "memory" as used hereinafter may encompass any type of memory unit for storing data.

Specifically, reference is now made to FIG. 1, which illustrates a telephone communication system 10 having silently selectable audible messaging. The system may include:

A memory module 15 for storing a plurality of pre-recorded messages and/or user data. The memory module may be a local memory unit (in the telephone unit) and/or may be a remote (non-local) unit (for example at the cellular operator). The memory unit may have pre-configured messages in memory and/or may have customized messages in memory;

A synthesizer module 18, which may be a text-to-speech module may be used for synthesizing a plurality of possible messages (optionally in real-time) from selected or typed words or expressions. Synthesizer module 18 may enable combining pre-recorded messages into a conversation, creating audio messages from text, whether the messages are pre-compiled text messages or are inputted during conversation.

Figure 3:
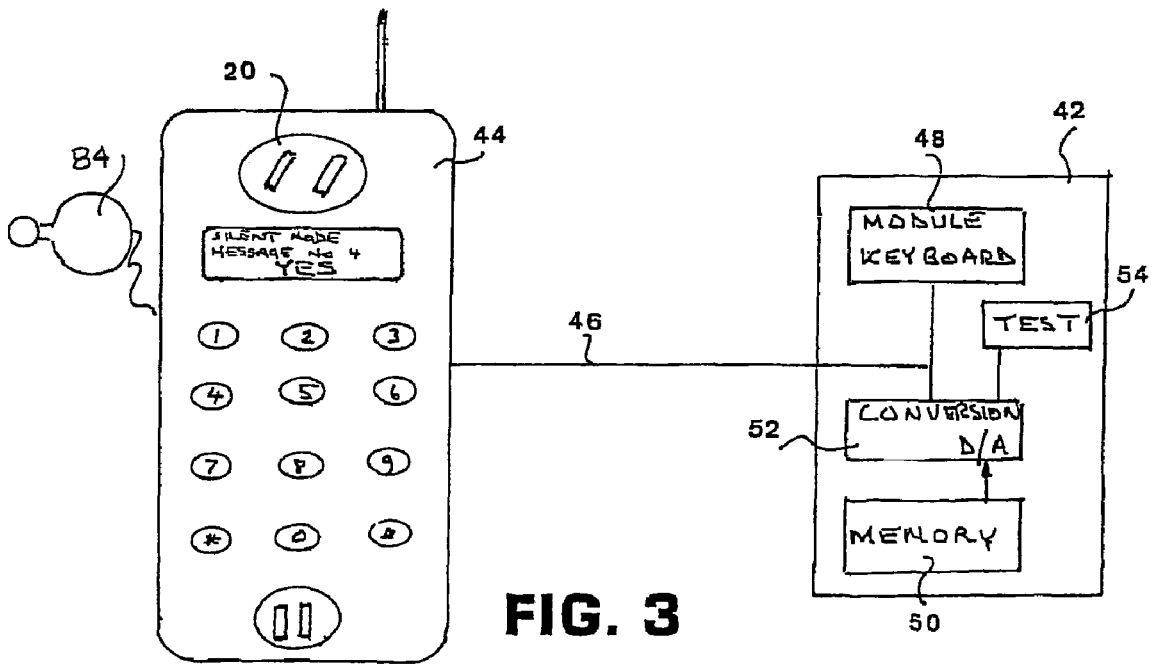
FIG. 3 is a diagrammatic view of components of a silent communication system housed in an enclosure connected to a telephone, according to some embodiments of the present invention.

A messaging module 12 connected to the memory, for enabling selection of a desired message and transmission of selected messages (optionally in real time) in response to signals from a keyboard 14 or alternative data entry means (such as, for example, a panel, pad, screen etc.). The messaging module 12 may also enable storage of new messages into memory 15, thereby creating a source or library of possible messages for silently activated conversation ("silent communication" sessions);

A conversion module 101 may convert the digital message data stored in memory 15 to an analog signal for transmission to non-digitalized destinations. In this way a message may be converted from digital to analog format, for analog transmission to at least a second party;

A menu-driven speech module 16 for enabling usage of at least one menu of possibilities (for example, (a) Stored expressions, (b) Stored word combinations, and (c) Real time typed words etc.) In some cases a Text-to-Speech module 18 may convert combined or typed words or expressions to analog signals which directly or through conversion module 101 may be transmitted to at least one other party;

System 10 may include testing means 102 (test-to-speech) for routing a selected stored or synthesized message for playback or preview by the speaker 20, seen in FIG. 3, of the telephone. The playback of the message may be a textual based message on the telephone screen, or an audible message played through the telephone's speaker or an insertable ear-speaker 84 connectable to a mobile telephone 76;

The hand-activated conversion module 100 may function as a control unit. Conversion module 100 may enable integration and/or synchronization of hand-activated communications.

A key-to-speech module 28 may enable the possibility of "one-touch" silent message sending. The key referred to may be a number (like "3") or a special key (like "yes" or "no") for selecting predetermined words or word combinations from memory. Various short cut keys or key combinations may be represented on one or more data cards, easing the efficiency of conducting "silent conversations". The data cards may be provided in a plurality of languages.

The system 10 of the present embodiment may have one or more components located in a central control facility 24. Control facility 24 may be administered by a telephone service company (service provider), which may provide access for use of system 10 by telephone users who dial a specified code number (26) of a service company;

Other system components such as microphone 30, and/or any other input means; display 32 and/or any other output means; phone book storage 34 etc. may be located in the domain 36 of the telephone user, such as in a telephone unit or alternative communications device. Additionally or alternatively, such components may be located in a conversation unit (such as 42 or 64), which may be a mobile device connected to the communications device.

The physical size of facility 24 may allow for housing a memory 15 of any required size. A large memory 15 in facility 24 may enable sharing of costs by a large number of users. In addition there may be no need for compression/decompression of stored signals. Moreover, a large memory 15 may allow the storage of any required phrases or sentences, which need not be shortened.

With reference to the rest of the figures similar reference numerals have been used to identify similar parts.

Figure 2:
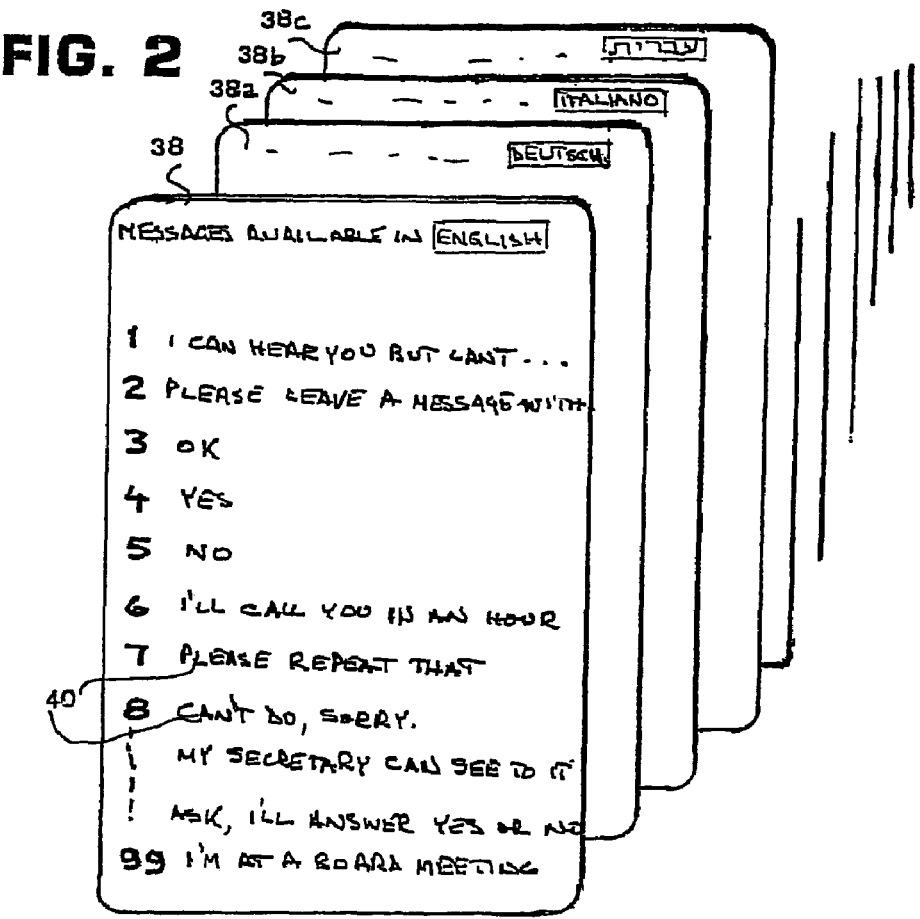
FIG. 2 is a schematic view of data cards, useful in combination with the embodiment of FIG. 1.

Referring now to FIG. 2, there are seen data cards that may be distributed to telephone users subscribing to the system 10 (described with reference to FIG. 1).

Each card may list "n" messages (for example, 99 messages as can be seen on card 38. These messages may correspond to messages stored in the large memory 10 of the central facility 24 referred to in FIG. 1, or to messages stored in an alternative memory or database. The messages may be user selectable by a minimal number of actions using the telephone keyboard 14, writing pad or any other input means. Users may use such cards to know effectively and silently participate in a conversation.

Data cards may be made available in various languages, as even inside a single country many conversations may be carried out in various languages other than the native language. Cards 38, 38a, 38b, 38c etc. illustrate examples of such cards.

FIG. 3 illustrates a telephone communication system wherein its components are housed in a conversation unit 42 connectable to a nearby cellular telephone 44, according to some embodiments of the present invention. The telephone 44 may be a standard communications device for which no alterations are necessary, aside from being connected by a flexible cable 46 or a wireless connection, for data communication between the telephone 44 and the components of the conversation unit 42.

Conversation unit 42 may include a keyboard 48 or alternative input means for message selection. Keyboard 48 or alternative input means may also be used for selecting silent mode, when required, and for selecting a message stored in the memory 50 within the conversation unit 42.

Conversation unit 42 may include a memory 50 of suitable capacity to store "n" voice messages. The messages may be converted by a conversion module 52 from memory 50 into analog signals that may be played, for example, by a telephone speaker 20. An example of a series of messages that may be transmitted from conversation unit 42 to telephone 44 during a "silent" conversation, from the side of the "silent speaker", may be as follows:

Answer an incoming call. Listen to conversation. "Yes". Listen to conversation. "No". Listen to conversation. "Sorry, impossible at present". Listen to conversation. "Just a moment, I'll transmit you a message". "Call my secretary, she'll give you the information". Listen to conversation. Compose new message "Her number is 5558122". Listen to conversation. "I will transfer you to my secretary". Make transfer to requested number. Hang up. Optionally a message such as "wait I am composing my answer" may be preset such that, for example, the communication device can transmit the message at any time during the conversation if a certain delay in answering or responding is determined.

In some cases, such as emergency situations, a spoken response may be required. For example, if a user understands that a distant party needs urgent clarification or emergency action is required, the user may initiate speaking mode by pressing a relevant function button. Alternatively, a user's speech may trigger such a mode. This mode may cause the communication unit to return to normal speech mode, or to function in a hybrid silent/voice mode, wherein voice input is accepted while the phone operates in silent mode.

When it is required to check the contents of a stored message before transmitting the message, a test button 54 may be pressed. This button may prompt the conversation unit 42, for example, for a message number. The user may enters the message number on the module keyboard 48. The message may then be retrieved from memory 50 through a digital/analogue conversion module 52 and may be audible to the user on the telephone speaker 20.

In some embodiments the conversation unit 42 may be small enough to be kept, for example, in a pocket while connected to the telephone 44. The conversation unit 42 may be body borne, handheld or otherwise transported. The conversation unit 42 may be wirelessly connected to telephone 44, thereby enabling wireless data communications between telephone 44 and conversation unit 42.

Figure 4:
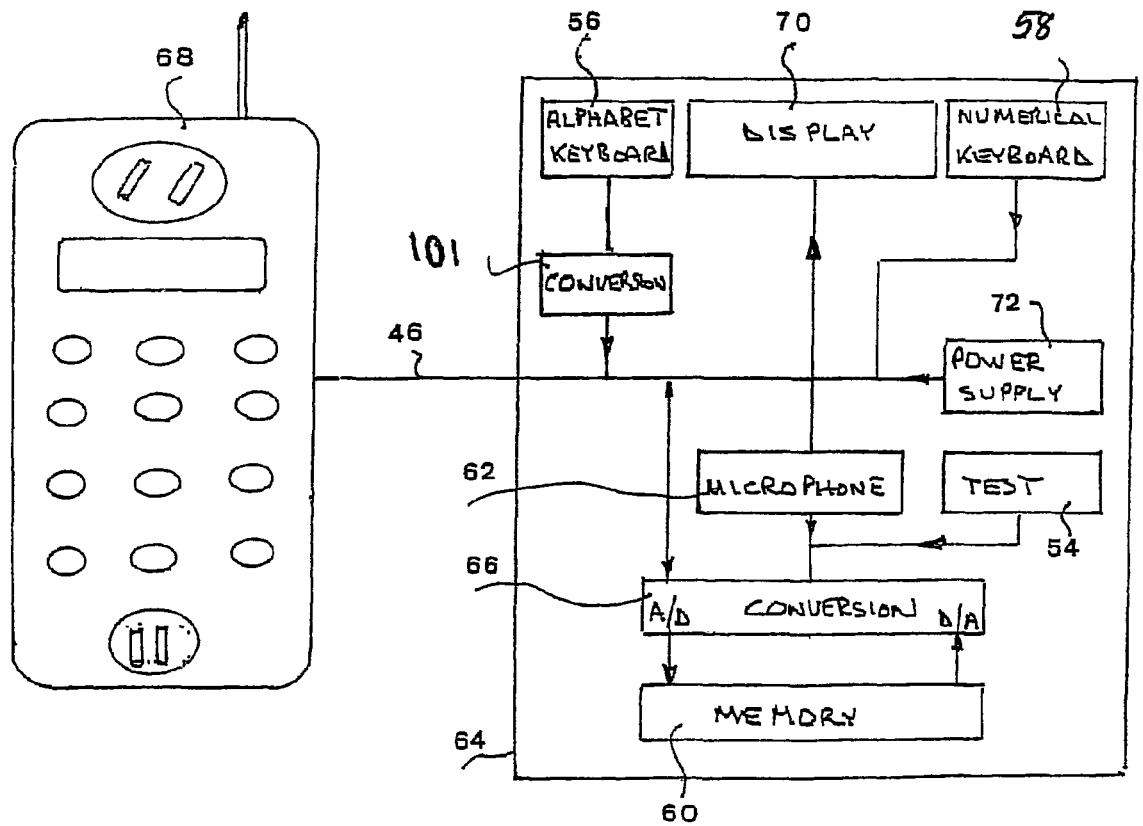
FIG. 4 is similar to FIG. 3, and shows a silent communication system having a letter keyboard and a display.

FIG. 4 illustrates an additional embodiment of the present invention, similar to that shown in FIG. 3 but extended to include additional services.

The keyboard (48 of FIG. 3) may include an alphabet keyboard 56, a numerical keyboard 58, touch screen or any other data input means. Alphabet keyboard 56, for example, may be used for implementing written message mode. By operation of the alphabet keyboard 56, text messages can be composed, selected and transmitted to a other telephone units, and received from other telephone units. A conversion module, which may be a "text-to-speech" module (like 18 at FIG. 1) may be used to convert words to audible messages. Such audible messages may subsequently be transmitted to a caller, by a caller (depending who is initiated the call), and/or by both a call initiator and a call receiver, where the messages may be received and heard in audible form. This mode of communication may enable customized expansion of available messages, thereby eliminating limits imposed by pre-recorded messages.

An example of user messages which a user may add to his/her message library are as follows:

"Fax it to Martin at 123 456"

"Suggest Cafe X at 12.45"

Memory 60 may be adapted to allow the recording of new user-generated voice messages. A microphone 62 on the conversation unit 64 may be connected to the memory 60 via a two-way conversion module 66. In this way, voice messages may be entered into the system without use of the cellular telephone 68 or a keyboard etc.

Examples of such messages that may be recorded are as follows:

"Call 987 654, Debbie deals with this"

"Fax it to me at 456 789"

The system may be further provided with a status monitoring display 70 on an outer face of the conversation unit 64, and a battery 72 to provide an independent power supply. An independent power supply may enable message recording off-line. The conversation unit 64 may be body borne, handheld or otherwise transported. The conversation unit 64 may be wirelessly connected to telephone 68, thereby enabling wireless data communications between telephone 68 and conversation unit 64.

Figure 5:
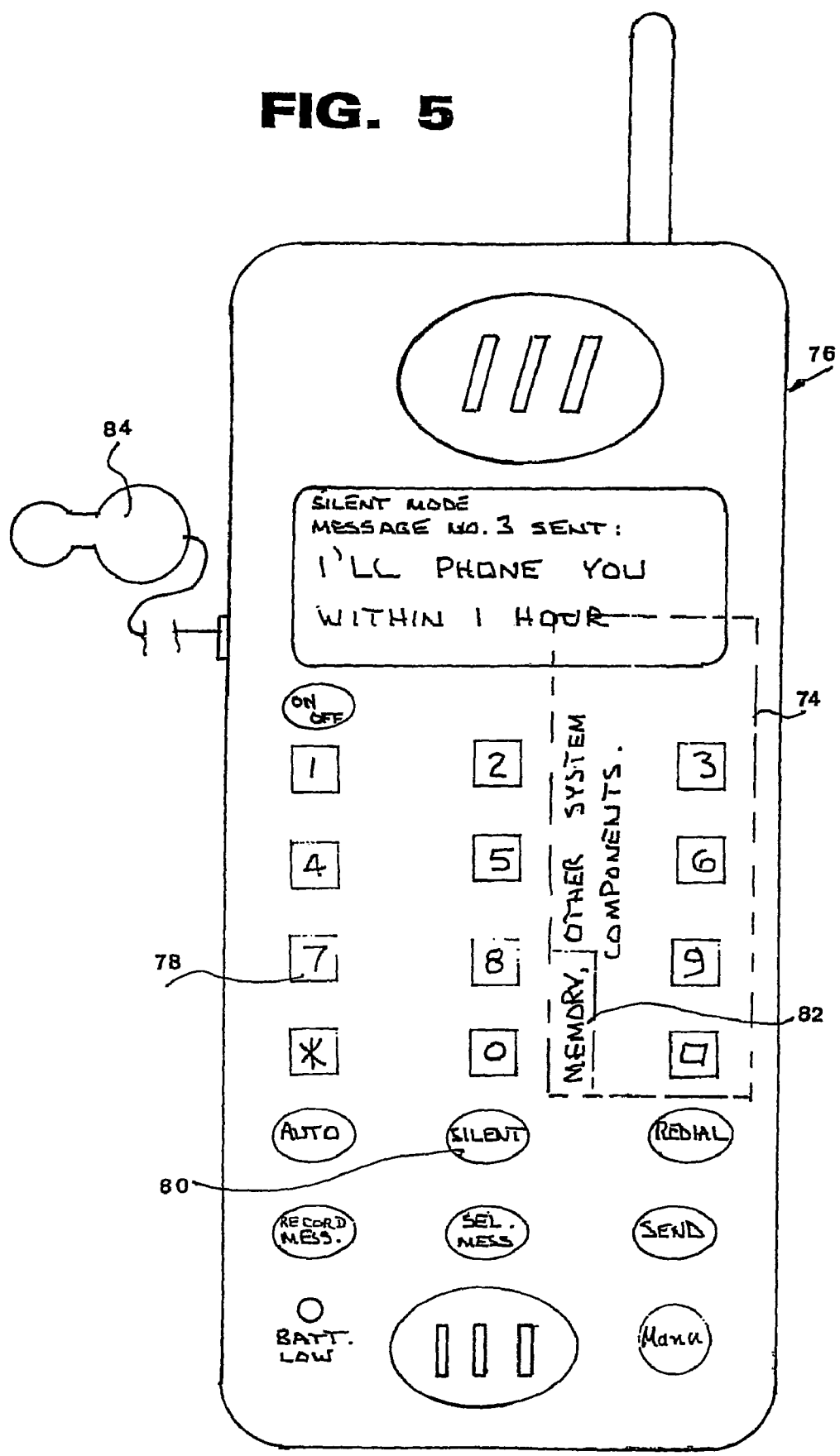
FIG. 5 is a schematic drawing of a silent communication system inside a cellular telephone, according to some embodiments of the present invention.

Referring now to FIG. 5, there is depicted a telephone communication system 74 enabling silently selectable audible messaging and communication. Components of the system 74 may be miniaturized and/or performed by software, and may be contained in the housing of an adapted cellular telephone 76 and connected to its circuitry. Such an arrangement is likely the most convenient for a user who is satisfied with the use of a limited number of short messages that can be stored without compression. These messages may be selected by use of the phone keyboard 78, after selecting silent mode 80, or from the menu. System 74 may be placed at any location within cellular telephone 76.

In one embodiment of the present invention, the memory unit 82 may be loaded with outgoing messages during manufacture of telephone 76. Examples of pre-loaded messages may be as follows:

"I can hear you but can't speak now". "Ask and I'll answer yes or no". "Yes". "No". "Please phone in an hour". "Please repeat that", etc.

In order to preserve silence, incoming call signals and incoming messages may be received by an ear-insertable speaker 84 connectable to cellular telephone 76.

Speaker 84 may be also used for a message pre-send trial, using test-to-speech module 102 (see FIG. 1) for routing a selected stored or synthesized message for textual and/or audio playback or preview.

It is to be appreciated that techniques for memory storage are constantly being reduced in both size and price. Therefore the severe space limitations inside a cellular telephone may in the future cease to be significant. Thus it may be possible to provide a memory unit large enough to store all required data therein without using compression techniques etc.

Figure 6:
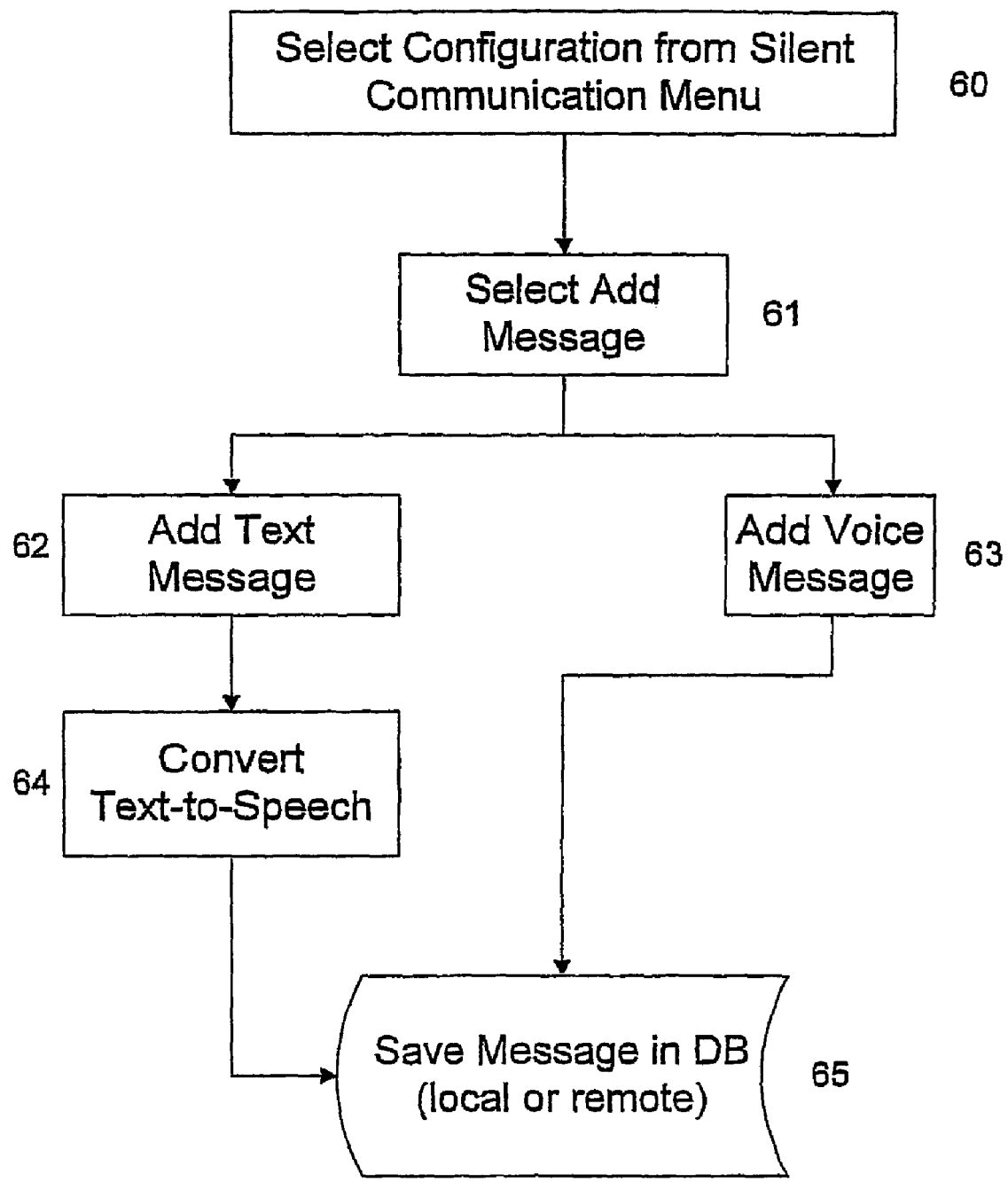
FIG. 6 is a flow chart describing a process for configuring a silent communication system according to some embodiments of the present invention, and in particular for adding new messages to the system.

According to some embodiments of the present invention, a method is provided for configuring silent communication. An example of such a method is illustrated in FIG. 6, as follows:

A user may select "silent communication" from a telephone unit button or menu, and may further select configuration or settings etc. to further configure silent communication services. The user may add messages, delete messages, edit messages, preview messages etc. An example of a process whereby messages are added may be as follows. Similar processes may be executed to change alternative settings:

A user may select "add new message" from the "configuration" menu. The user may subsequently choose between adding a text item or a voice item.

In the case where a user selects to add a text item, a text message may be added using the telephone unit or communication unit's keypad, keyboard etc. In this case, the text message, once entered, may be converted to a voice message using a text-to-speech module. In the case where a user selects to add a voice message, the user may be prompted to record a voice message using a microphone. In either of the above cases, the new message may be stored in either a local and/or remote database/memory unit.

Figure 7:
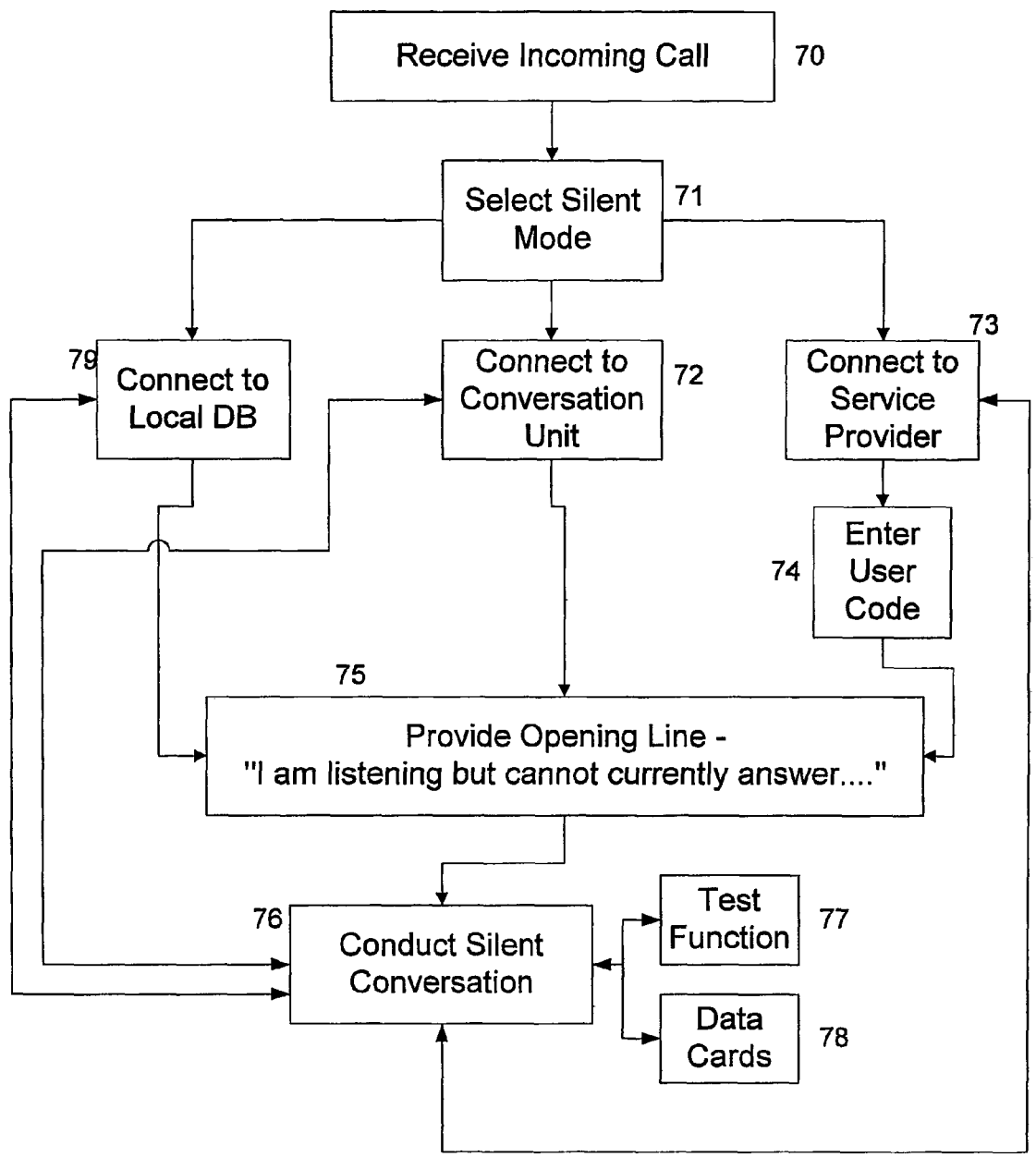
FIG. 7 is a flow chart describing a process for conducting a conversation using a silent communication system, according to some embodiments of the present invention.

According to some embodiments of the present invention, a method is provided for enabling a telephone user to implement silently selectable audible messaging or communication and editing messages in real time using text to speech engine. An example of such a method is illustrated in FIG. 7, as follows:

A user may initially set his/her phone to a non-ringing code, so as not to cause a disturbance when receiving an incoming call or making an outgoing call. In either of these cases a user may select "silent mode". Silent mode may initiate a connection to a conversation unit or to a service provider. The connection to the service provider may require adding of a user code to secure access to the silent communication service from the service provider.

Whether the silent communication system is configured to be implemented by the telephone unit, conversation unit and/or the service provider, the service may initiate an opening line statement such as, for example, "Hi, I can hear you but I cannot currently speak. Please repeat your request, and I will answer by sending you a suitable pre-recorded message or composing a message to be spoken by a text to speech engine." This is an example of quite a long message, which may be stored in a database in the telephone unit, conversation unit and/or the service provider database. In the case where such a message is stored in local memory (of the telephone unit), compression/decompression may be required to use and transmit such a message.

The user may subsequently conduct a "silent conversation" using the various features provided by the silently selectable audible messaging system. The user may click on various buttons, type in or write into to the telephone unit particular numbers, letters or codes for selected statements, in response to a caller's content. For example, a user who is unsure of the contents of a stored message may activate test-to-speech mode 102, to preview pre-recorded messages before sending them. Accordingly, the user may select the message number to be checked using keyboard 14 or an alternative input device. The message chosen may then be sent to the telephone speaker 20 or appear in written form on the display 32, thereby providing the user with an opportunity to verify the message before sending. The user may additionally or alternatively use data cards to aid the user in conducting a silent conversation.

The foregoing description of the embodiments of the invention has been presented for the purposes of illustration and description. It is not intended to be exhaustive or to limit the invention to the precise form disclosed. It should be appreciated by persons skilled in the art that many modifications and variations are possible in light of the above teaching. It is intended that the scope of the invention be limited not by this detailed description, but rather by the claims appended hereto. For example, while the present invention has been described with respect to cellular telephone units, the scope of the present invention may include non-wireless telephone units or any other communication units.

The invention claimed is:

1. A cellular telephone which silently generates and transmits audio signals to a distant telephone during a telephone conversation and which is adapted to receive voice generated audio signals from said distant telephone over a communication channel that carries said telephone conversation comprising:

a memory for storing a plurality of pre-recorded audible records and a plurality of pre-stored text messages, wherein said pre-recorded audible records and said pre-stored text messages are selectable via a user input circuit of said cellular telephone;

a text to speech module adapted to convert into audible messages: (1) one or more of said pre-stored text messages selected by a user; and (2) text messages manually typed into the telephone during the telephone conversation;

a conversation module adapted to selectively transmit, during the conversation, to said distant telephone: (1) one or more of said pre-recorded audible records, and (2) one or more of said text to speech converted audible messages, both pre-stored and manually typed during the conversation;

a testing mechanism enabling review of said text to speech converted audible messages before sending them;

a synthesizer module adapted to generate audio message signals from source texts, which audio signals represent human speech of the source texts; and said synthesizer module is further adapted to silently generate, during a given conversation, second audio message signals from second source texts, which second source texts are input into a keyboard of the cellular telephone, by a user of the telephone, during the given conversation, and wherein said audio signals represent human speech of the second source texts and said conversation module is further adapted to transmit one or more of said second audio message signals during the given conversation, over a communication channel which carries the given conversation.

2. A cellular telephone according to claim 1 wherein said testing mechanism further enabling review of said text to speech converted audible messages after said messages are inputted.

3. The module according to claim 1, wherein said source texts include pre-stored text messages.

4. The module according to claim 1, wherein said synthesizer module is further adapted to generate third audio message signals from a combination of one or more of the source texts with one or more of the second source texts, which third audio message signals represent human speech of the combination, and wherein said conversation module is further adapted to transmit one or more of the third audio message signals during the given conversation, over a communication channel which carries the given conversation.

5. The telephone according to claim 1, wherein said text to speech module is further adapted to convert one or more selected combinations of pre-stored text messages and messages that are inputted by operating a keyboard during the telephone conversation, into second text to speech converted audible messages.

\* \* \* \* \*